United States Patent
Lie et al.

(10) Patent No.: US 9,699,150 B2
(45) Date of Patent: *Jul. 4, 2017

(54) SYSTEM AND METHOD FOR SECURE CLOUD COMPUTING

(71) Applicant: Virtustream IP Holding Company LLC, Bethesda, MD (US)

(72) Inventors: David Lie, Toronto (CA); Reuven Cohen, Toronto (CA); Richard Reiner, Toronto (CA)

(73) Assignee: Virtustream IP Holding Company LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,352

(22) Filed: Jun. 5, 2015

(65) Prior Publication Data
US 2015/0271152 A1 Sep. 24, 2015

Related U.S. Application Data

(63) Continuation of application No. 13/641,340, filed as application No. PCT/CA2011/000283 on Mar. 16, 2011, now Pat. No. 9,081,989.
(Continued)

(51) Int. Cl.
*H04L 29/06* (2006.01)
*G06F 9/455* (2006.01)
(Continued)

(52) U.S. Cl.
CPC ...... *H04L 63/0435* (2013.01); *G06F 9/45558* (2013.01); *G06F 21/57* (2013.01);
(Continued)

(58) Field of Classification Search
CPC ............ G06F 21/64; G06F 21/602; G06F 2009/45587; G06F 9/45558;
(Continued)

(56) References Cited

U.S. PATENT DOCUMENTS 6,324,177 B1 * 11/2001 Howes ................. H01R 31/005
370/389
8,301,686 B1 10/2012 Appajodu
(Continued)

FOREIGN PATENT DOCUMENTS

| CN | 1924863 | 3/2007 |
| CN | 101674324 | 3/2010 |
| EP | 1 818 833 | 8/2007 |

OTHER PUBLICATIONS

Descher et al, Retaining Data Control to the Client in the Infrastructure Clouds, 2009, IEEE, pp. 9-16.*
(Continued)

*Primary Examiner* — Luu Pham
*Assistant Examiner* — Jenise Jackson
(74) *Attorney, Agent, or Firm* — Ryan, Mason & Lewis, LLP

(57) ABSTRACT

In a method for secure cloud computing, a virtual machine (VM) associated with a client is executed at a computer within a trusted computing cloud. An image including state information of the VM is obtained; storage of the image is arranged; a freshness hash of the image is determined; and the freshness hash is sent to the client. Subsequently, at the same computer or at a different computer within the trusted computing cloud, the stored image may be retrieved; a freshness hash of the retrieved image may be determined; the freshness hash of the retrieved image may be sent to the client; and an indication may be received from the client verifying the integrity of the freshness hash of the stored image.

30 Claims, 11 Drawing Sheets

Related U.S. Application Data

(60) Provisional application No. 61/317,464, filed on Mar. 25, 2010.

(51) Int. Cl.
| | |
|---|---|
| *H04L 9/32* | (2006.01) |
| *G06F 21/60* | (2013.01) |
| *G06F 21/64* | (2013.01) |
| *G06F 21/57* | (2013.01) |
| *H04L 9/08* | (2006.01) |

(52) U.S. Cl.
CPC ............ *G06F 21/602* (2013.01); *G06F 21/64* (2013.01); *H04L 9/0897* (2013.01); *H04L 9/3234* (2013.01); *H04L 9/3239* (2013.01); *H04L 63/062* (2013.01); *H04L 63/0853* (2013.01); *H04L 63/0876* (2013.01); *G06F 2009/45587* (2013.01)

(58) Field of Classification Search
CPC ... G06F 2009/45575; G06F 2009/4557; G06F 9/45533; H04L 29/06
USPC ........................................................ 713/165
See application file for complete search history.

(56) References Cited

U.S. PATENT DOCUMENTS

| | | |
|---|---|---|
| 2006/0174240 A1 | 8/2006 | Flynn |
| 2007/0130566 A1* | 6/2007 | van Rietschote ... G06F 9/45533 718/1 |
| 2007/0204166 A1* | 8/2007 | Tome ................. H04L 63/0272 713/182 |
| 2007/0208918 A1 | 9/2007 | Harbin et al. |
| 2007/0209818 A1 | 9/2007 | Forrest et al. |
| 2008/0046581 A1* | 2/2008 | Molina ................... H04L 63/08 709/229 |
| 2008/0083031 A1 | 4/2008 | Meijer et al. |
| 2009/0089860 A1* | 4/2009 | Forrester ................ H04L 63/12 726/3 |
| 2009/0222474 A1 | 9/2009 | Alpern |
| 2009/0222674 A1 | 9/2009 | Leichsenring et al. |
| 2009/0240953 A1* | 9/2009 | Paul ........................ G06F 21/62 713/193 |
| 2009/0259855 A1 | 10/2009 | de Casare |
| 2009/0293056 A1 | 11/2009 | Ferris |
| 2009/0300607 A1 | 12/2009 | Ferris et al. |
| 2009/0300719 A1 | 12/2009 | Ferris |
| 2010/0049992 A1 | 2/2010 | Leichsenring et al. |
| 2010/0153749 A1 | 6/2010 | Sakai |
| 2010/0161998 A1* | 6/2010 | Chen ....................... G06F 21/57 713/189 |
| 2010/0329572 A1* | 12/2010 | Kamay ................. G06F 3/1454 382/209 |
| 2011/0093847 A1* | 4/2011 | Shah .................... G06F 9/45558 718/1 |
| 2012/0166781 A1 | 6/2012 | de Casare |

OTHER PUBLICATIONS

Kangarlou et al, Taking Snapshots of Virtual Networked Environments, Nov. 12, 2007, ACM, pp. 1-8.*
International Search Report issued in PCT/CA2011/000283 dated Jun. 3, 2011.
International Preliminary Report on Patentability and Written Opinion of International Searching Authority issued in PCT/CA2011/000283 dated Sep. 25, 2012.
Chinese Office Action issued in CN 201180015996.8 on Feb. 4, 2015 with English Language Translation.
Zhang et al. Exploiting Data Deduplication to Accelerate Live Virtual Machine Migration, 2010, IEEE, pp. 88-96.
Aaraj et al., Energy and Execution Time Analysis of a Software Based Trusted Platform Module, 2007, IEEE, pp. 1-6.
English Language Abstract for CN1924863 published Mar. 7, 2007.
English Language Abstract for CN101674324 published Mar. 17, 2010.
Extended European Search Report issued in EP 11758705.5-1870 dated Aug. 18, 2015.
Joseph Torrellas et al., Manitou , Proceedings of the 1$^{st}$ Workshop on Architectural Software Dependability, ASID '06, Jan. 1, 2006, pp. 6-11.
Xinwen Zhang et al., "Securing Elastic Applications on Mobile Devices for Cloud Computing", CCSW '09 Proceedings of the 2009 ACM Workshop on Cloud Computing Security, Nov. 13, 2009, pp. 127-134.
T. Garfinkel, "Terra: A Virtual Machine-Based Platform for Trusting Computing", ACM SOSP. Proceedings of the ACM Symposium on Operating Systemsprinciples, Oct. 19, 2003, pp. 193-206.
Jinpeng Wei et al., "Managing Security of Virtual Machine Images in a Cloud Environment", Proceedings of the 2009 ACM Workshop on Cloud Computing Security, CCSW '09, Jan. 1, 2009, p. 91.
Chinese Office Action issued in CN 201180015996.8 dated Oct. 23, 2015.
English Language Translation for Chinese Office Action issued in CN 201180015996.8 dated Oct. 23, 2015.

* cited by examiner

SYSTEM AND METHOD FOR SECURE CLOUD COMPUTING

CROSS-REFERENCE TO RELATED APPLICATION

This application is a continuation of U.S. application Ser. No. 13/641,340 filed Apr. 4, 2013. U.S. application Ser. No. 13/641,340 is based upon and claims the benefit of priority from the International Application No. PCT/CA2011/000283, filed Mar. 16, 2011, which claims the benefit of U.S. provisional Application No. 61/317,464, filed Mar. 25, 2010. The entirety of all of the above-listed Applications are incorporated herein by reference.

FIELD OF THE INVENTION

The present invention relates generally to cloud computing and, more specifically, to improved systems and methods for secure cloud computing.

BACKGROUND

Cloud computing providers deliver computing infrastructures as a fully outsourced service, enabling companies to reduce capital expenditure on hardware, software and support services by paying a provider only for what they use.

Cloud computing services may be offered at various layers of the software stack. At lower layers, Infrastructure as a Service (IaaS) systems allow users to have access to entire virtual machines (VMs) hosted by the provider, and the users are responsible for providing the entire software stack running inside a VM. At higher layers, Software as a Service (SaaS) systems offer online applications that can be directly executed by the users.

Despite its advantages, cloud computing raises security concerns as users have limited means of ensuring the confidentiality and integrity of their data and computation. Users of cloud computing services are particularly vulnerable to malicious providers or malicious customers of the same provider.

In order to increase the security and trust associated with communications to a given computer platform, Hardware Security Modules (HSMs) have been used to enable construction of trusted platforms. An HSM is a coprocessor that is typically affixed to a computer's motherboard. It can create and store cryptographic keys and other sensitive data in its shielded memory and provides ways for platform software to use those services to achieve security goals. A popular HSM in use today is the Trusted Processing Module (TPM), as specified by the Trusted Computing Group (TCG).

While a number of different distributed computing architectures built on the TPM standard have been proposed, security concerns in the cloud computing space still persist.

SUMMARY OF THE INVENTION

In overview, a method of secure cloud computing comprises, at a computer within a trusted computing cloud: executing a virtual machine (VM) associated with a client; obtaining an image of the VM, the image including state information; arranging storage of the image; determining a freshness hash of the image; and sending the freshness hash of the image to the client. The method may further comprise, at the computer, ceasing execution of the VM; and at the computer or at a different computer within the trusted computing cloud: retrieving the stored image; determining a freshness hash of the retrieved image; sending the freshness hash of the retrieved image to the client; and receiving an indication from the client verifying the integrity of the freshness hash of the retrieved image.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only.

DETAILED DESCRIPTION

Figure 1:
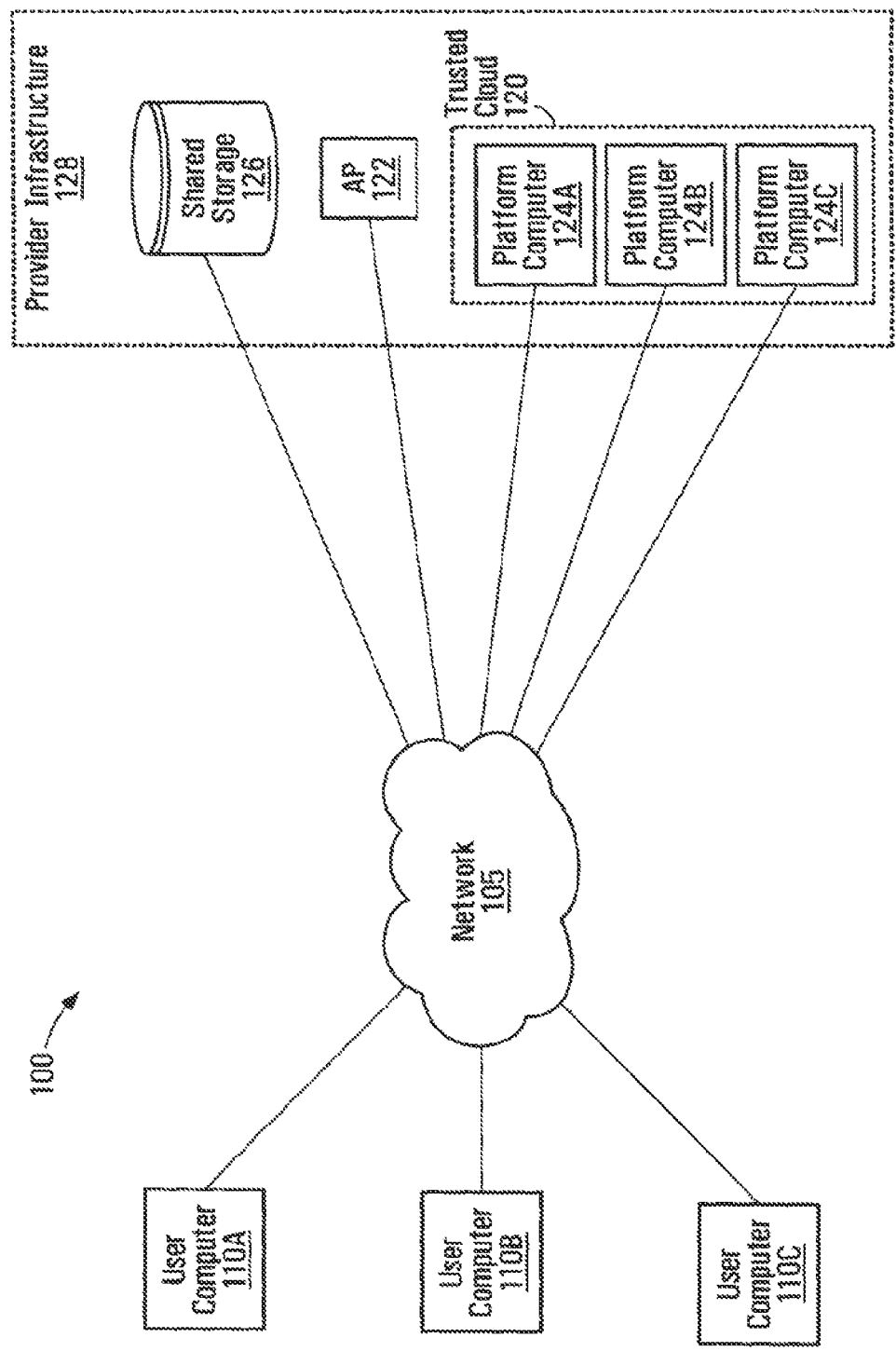
FIG. 1 is a schematic diagram of a system for providing secure cloud computing according to an embodiment.

FIG. 1 illustrates a schematic diagram of a secure cloud computing system 100 exemplary of an embodiment of the present disclosure. System 100 includes a number of user computers 110*a*-110*c* coupled via a network 105 to a trusted cloud computing provider's ("TCC provider") infrastructure 128. Network 105 may be a local area network (LAN), a wide area network (WAN), the Internet, or a combination of different networks. Infrastructure 128 includes an administration platform (AP) 122, a shared storage 126, and a trusted computing cloud (TCC) 120. TCC 120 includes a number of trusted platform computers 124*a*-124*c*.

Figure 2:
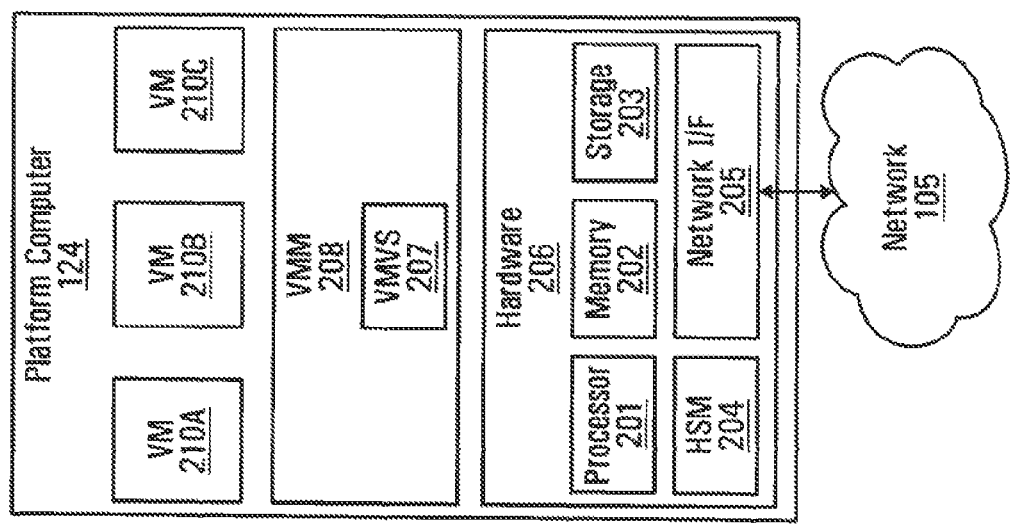
FIG. 2 is a simplified block diagram of a trusted platform of the system of FIG. 1.

An embodiment of trusted platforms 124*a*-124*c* is illustrated in FIG. 2. As shown, trusted platform 124 includes platform hardware 206, a virtual machine monitor (VMM) 208, and a number of virtual machines (VMs) 210*a*-210*c*.

Platform computer 124 (FIG. 2) may be implemented as a computing appliance with standard protections against an attacker. The appliance implementation of platform computer 124 presents the TCC provider with a limited interface that allows configuration of platform computer 124 for integration into infrastructure 128. Capabilities that would allow the TCC provider to violate the confidentiality or integrity of VMM 208 or VMs 210 may be disabled and excluded from the appliance interface.

Platform hardware 206 includes a processor 201, memory 202, storage 203, a network interface 205, and a hardware security module (HSM) 204.

Memory 202 may be any conventional memory device, such as a Random Access Memory (RAM) or the like. Storage 203 may be any conventional storage device, such as a magnetic hard disk, a solid state drive, or the like. Network interface 205 may be any conventional network interface, such as a modem, a network interface card (NIC), or the like.

Processor 201 may include, but is not limited to, any conventional processor capable of entering an execution environment whose integrity can be cryptographically verified. Examples of such processors are Intel® processors with TXT capability, AMD® processors with SVM capability, or the like. It is appreciated that instructions executable by processor 201 may be stored in storage 203, or in other types of memory devices, such as a read only memory (ROM) or a similar storage element. It is also appreciated that instructions executable by processor 201 may be temporarily loaded into a volatile memory, such as memory 202.

HSM 204 provides conventional hardware security functions such as cryptographic functions including key generation, hashing, signing, verification, encryption and decryption. These operations are performed in conventional ways. For example, HSM 204 may employ the Rivest-Shamir-Adleman (RSA) algorithm for encryption/decryption and digital signature operations, and the Secure Hash Algorithm SHA-1 for hash operations. The HSM also provides tamper-resistant storage for data, namely cryptographic keys and hashes in non-volatile RAM located in the HSM package. In some embodiments, HSM 204 is a TPM which is compliant with TCG Specification Version 1.2.

VMM 208 is a virtualization layer that allows multiple operating environments, such as VMs 210a-210c, to run on platform 124 concurrently. Each VM 210a-210c is an independent software implementation of a physical machine with fully functional hardware that can run its own operating system (OS). The TCC provider may allow users to have access to VMs 210a-210c as a service. A user may be responsible for providing the entire software stack running inside a VM, or the TCC provider may offer access to a VM with a pre-installed software stack that can be directly executed by the user. In addition, and as described in more detail below, the TCC provider may allow users to supply their own complete VM 210 for execution on top of VMM 208. Thus, as described in more detail below, each VM 210a-210c may be associated with, and be accessed by, one or more user computers 110a-110c.

VMM 208 includes a VM Validation Server (VMVS) 207. As described in more detail below, VMVS 207 enables a user computer 110 to validate the integrity and authenticity of an associated VM 210 in a confidential manner.

Figure 3:
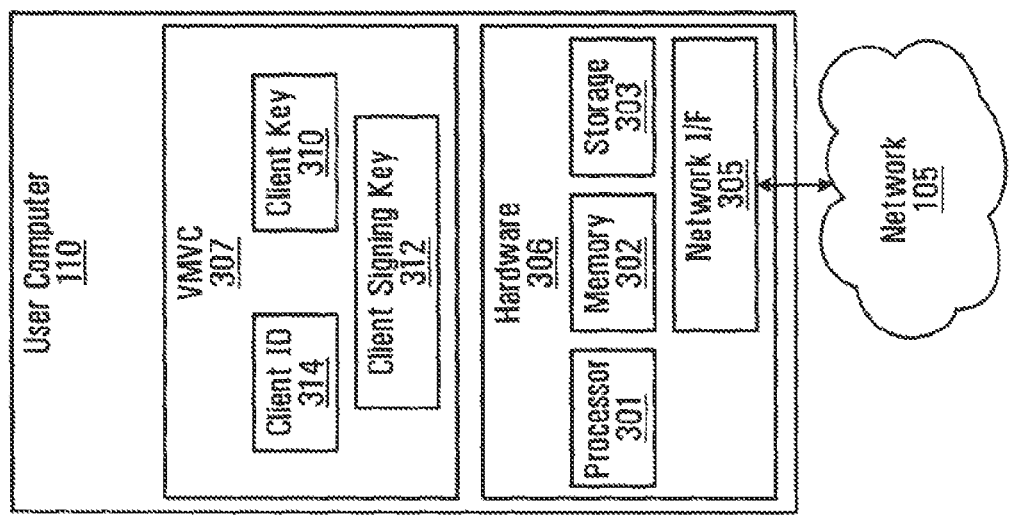
FIG. 3 is a simplified block diagram of a user computer of the system of FIG. 1.

An embodiment of user computers 110a-110c is illustrated in FIG. 3. As shown, user computer 110 includes client hardware 306 and a VM Validation Client (VMVC) 307.

Client hardware 306 includes a processor 301, a memory 302, a network interface 305, and storage 303. Processor 301 may be any conventional processor, such as an Intel® x86 processor, an AMD® x86 processor or the like. Memory 302 may be any conventional memory device, such as a Random Access Memory (RAM) or the like. Storage 303 may be any conventional storage device, such as a magnetic hard disk, an optical disk, or the like. Network interface 305 may be any conventional network interface, such as a modem, a network interface card (NIC), or the like. It is appreciated that instructions executable by processor 301 may be stored in storage 303, or in other types of memory devices, such as a read only memory (ROM) or a similar storage element. It is also appreciated that instructions executable by processor 301 may be temporarily loaded into a volatile memory, such as memory 302.

VMVC 307 is a client-side application which, as described in more detail below, is configured to communicate with VMVS 207 in trusted platform 124 in order to validate the integrity and authenticity of an associated VM 210 in a confidential manner. VMVC 307 uses a standard random number generator to generate two cryptographic keys, which are then stored within VMVC 307 as a client key 310 and a client signing key 312. Client key 310 and client signing key 312 are symmetric private keys, though persons skilled in the art will appreciate that in some embodiments other types of cryptographic keys may be used, such as for example asymmetric key pairs. As described in more detail below, client key 310 and client signing key 312 are used by VMVC 307 and VMVS 207 of VMM 208 to perform encryption/decryption and signing operations. VMVS 207 also includes client identification information (client ID) 314 unique to the user of user computer 110.

Figure 4:
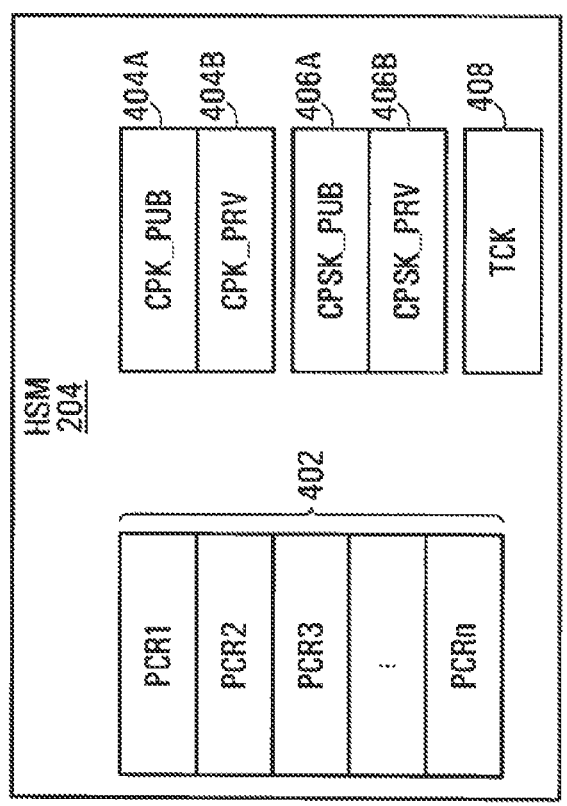
FIG. 4 is a simplified block diagram of a hardware security module of the trusted platform of FIG. 2.

An embodiment of HSM 204 is illustrated in FIG. 4. As shown, HSM 204 includes a set of Platform Configuration Registers (PCRs) 402, an asymmetric Cloud Provider Key (CPK) pair 404a, 404b, an asymmetric Cloud Provider Signing Key (CPSK) pair 406a, 406b, and a symmetric Trusted Cloud Key (TCK) 408. As will be appreciated, each asymmetric key comprises a public key (PUB) and a private key (PRV).

The keys CPK 404a, 404b, CPSK 406a, 406b, and TCK 408 are installed into HSM 204, for example by a trusted third party (e.g. a certifying authority), when a platform 124 is commissioned. This step is performed in a manner that is known to those skilled in the art. CPK_PRV 404b, CPSK_PRV 406b, and TCK 408 are stored in a protected area of HSM 204 that is inaccessible even to the TCC provider, and are only released by HSM 204 to trusted entities in specific circumstances as described in more detail below. It is appreciated that public keys CPK_PUB 404a and CPSK_PUB 406a are not required to be protected.

PCRs 402 are used for storing integrity measurements of software components present on the host platform 124. A software component may be, for example, an application executable, a configuration file or a data file. As is typical, measuring is done by hashing the software component with a hash function, such as SHA-1. The result is the integrity measurement of that software component. An integrity measurement may be stored in a particular PCR 402 by extending the PCR using the conventional extend operation: extend (PCR, new measurement)=SHA-1 (PCR+new measurement). A new measurement value is concatenated with the current PCR value and then hashed by SHA-1. The result is then stored as a new value of the PCR. The extend operation preserves the order in which measurements were extended, and allows an unlimited number of measurements to be stored in a given PCR. The host platform's 124 state can be attested by comparing the PCR values with reference values to see whether the platform 124 is in a trustworthy state or not.

Trusted platform 124 is configured to undergo a secure launch process, for example by using a chain of trust originating from a Core Root of Trust Measurement (CRTM). This could be accomplished using the measured launch capability in suitable Intel® TXT processors to create a dynamic root of trust (DRTM), or by using the SKINIT instruction on suitable AMD® processors. The secure launch process allows HSM 204 to ascertain that VMM 208 is trustworthy before releasing CPK_PRV 404b, CPSK_PRV 406b, and TCK 408 to it. For example, a Measured Launch Environment (MLE) that is protected from all previously loaded code on the system, including all previously loaded BIOS functions, drivers and kernel code, may be created. Code to be run in the MLE is then loaded. The MLE measures the code of the secure launch procedure and each subsequently loaded piece of code by computing a hash of the code (e.g. using SHA-1) and using the hash value to extend the contents of a PCR 402 on HSM 204. If at the end of the secure launch sequence the value in PCR 402 matches a predetermined value that defines a trusted software stack, then HSM 204 releases the CPK_PRV 404b, CPSK_PRV 406b, and TCK 408 to the software running in the MLE.

VMM 208 may be configured to obtain keys CPK_PRV 404b, CPSK_PRV 406b, and TCK 408 from HSM 204 on an as-needed basis, and to erase those keys from its local memory when they are no longer needed. In such case, each time VMM 208 attempts to obtain a key from HSM 204, HSM 204 ascertains whether VMM 208 is trustworthy prior to releasing the key to it, for example by again checking that the value of the appropriate PCR 402 matches a predetermined value that defines a trusted software stack.

As described in more detail below, VMM 208 uses keys CPK 404a, 404b, CPSK 406a, 406b, and TCK 408 to perform encryption/decryption and signing operations. Similarly, and as described in more detail below, VMVC 307 uses public keys CPK_PUB 404a and CPSK_PUB 406a to perform encryption and signing operations.

Figure 5:
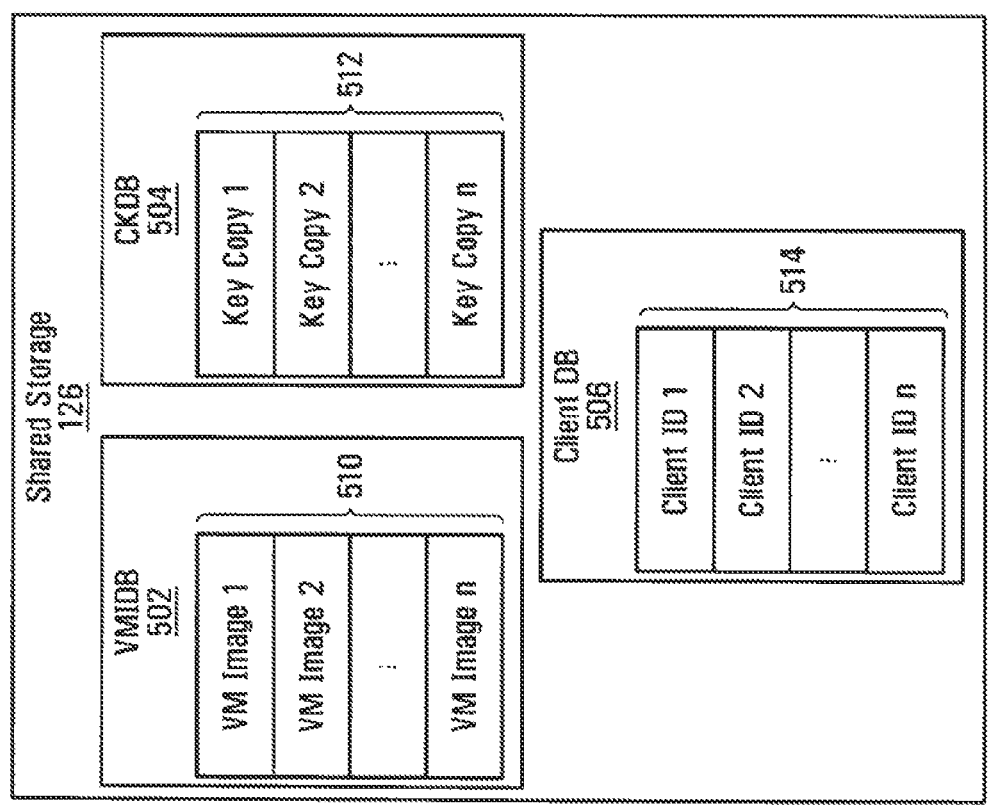
FIG. 5 is a simplified block diagram of a shared storage of the system of FIG. 1.

As shown in FIG. 5, shared storage 126 includes a VM image database (VMIDB) 502, a client key database (CKDB) 504, and a client database (CDB) 506. Shared storage 126 may be any conventional storage backend, such as a Network-Attached Storage (NAS), a Storage Area Network (SAN), or the like. It will be appreciated that shared storage 126 may reside outside TCC 120, as shown in FIG. 1, so long as any sensitive data stored in shared storage 126 is secured, for example, through encryption.

VMIDB 502 is used by VMMs 208 running on TPs 124a-124c to store images 510 of VMs 210a-210c. As described in more detail below, each VM image 510 stored in VMIDB 502 may be signed with a client signing key 312 and encrypted with a client key 310 so that they are only accessible to entities that have access to those keys. Advantageously, a VM image stored in VMIDB 502 that is signed and encrypted with keys 312, 310 may, on request, be transmitted directly to the corresponding user computer 110 without the need for additional security measures.

CKDB 504 is used by VMMs 208 running on TPs 124a-124c to store copies 512 of client keys 310 and client signing keys 312 received from VMVCs 307 running on user computers 110a-110c. Advantageously, entries in CKDB 504 may be encrypted with TCK 408 so that they are only accessible to trustworthy VMMs 208.

CDB 506 is used by VMMs 208 running on TPs 124a-124c to store client identification information 514 associated with corresponding VMVCs 307 running on user computers 110a-110c. Advantageously, entries in CDB 506 may also be encrypted with TCK 408 so that they are only accessible to trustworthy VMMs 208.

Advantageously, and as described in more detail below, system 100 (FIG. 1) is tolerant to node failures. Specifically, VMVC 307 is capable of differentiating between random failure of a platform 124 that destroys data, and deliberate malicious actions that attempt to tamper with data.

Operation of secure cloud computing system 100 will now be described with reference to FIGS. 6-10 along with continued reference to FIGS. 2, 3 and 5. In the scenarios illustrated in FIGS. 6-10, it is assumed that user computer 110 is running VMVC 307, and that platform 124 is running VMVS 207 and VMM 208.

Figure 6:
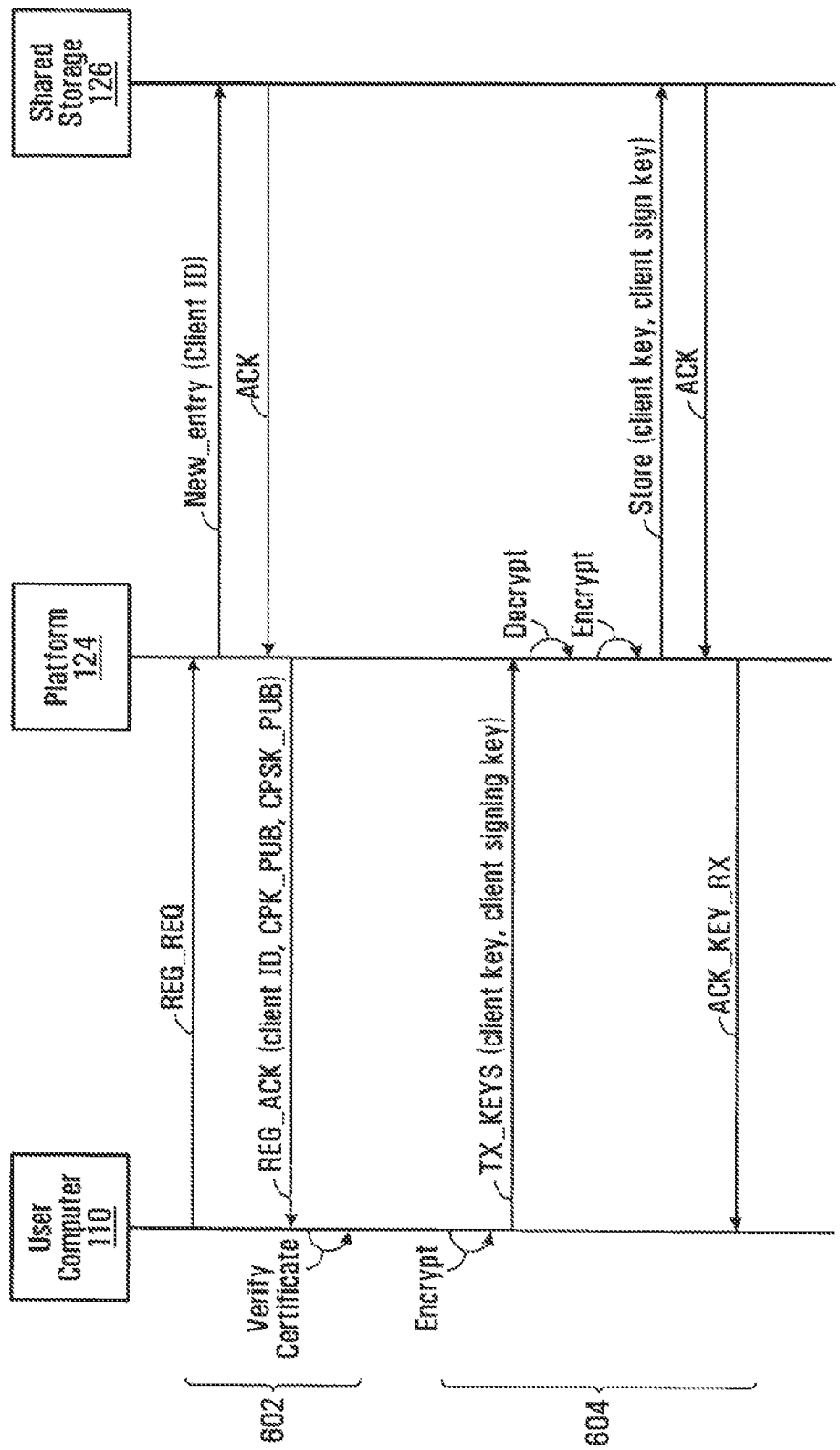
FIG. 6 is a schematic diagram for registration of a user computer with a trusted cloud according to an embodiment.

FIG. 6 illustrates a sequence diagram for registration of a new user computer 110 with TCC 120, according to an embodiment of the disclosure.

At steps 602, VMVC 307 running on user computer 110 registers with TCC 120. Specifically, VMVC 307 transmits a registration request (REG_REQ) to platform 124. In response to REG_REQ, VMVS 207 running on platform 124 creates a new entry in CDB 506 along with a unique client ID 314. VMVS 207 then transmits an acknowledgement message (REG_ACK) to user computer 110, along with the new client ID 314, acknowledging that REG_REQ has been successfully processed. The REG_ACK message may include the CP public keys CPK_PUB 404a and CPSK_PUB 406a, which may be retrieved and stored by VMVC 307 for later use as described below. CPK_PUB 404a and CPSK_PUB 406a may be certified and signed by a trusted certification authority (CA). Thus, VMVC 307 may verify the validity of the certificate before proceeding.

Subsequent to receiving the REG_ACK, VMVC 307 transmits client key 310 and client signing key 312 to platform 124 (steps 604). VMVC 307 encrypts these keys 310, 312 using CPK_PUB 404a before transmitting them to platform 124 in a TX_KEYS message. This ensures that only a platform 124 within TCC 120 may recover keys 310, 312. In response to the TX_KEYS message, VMVS 207 running in platform 124 decrypts the received keys 310, 312 using CPK_PRV 404b, obtains TCK 408 from HSM 204, and re-encrypts keys 310, 312 using TCK 408, before storing them in CKDB 504. VMVS 207 then transmits an acknowledgement message (ACK_KEY_RX) to user computer 110 acknowledging that TX_KEYS has been successfully processed.

Figure 7:
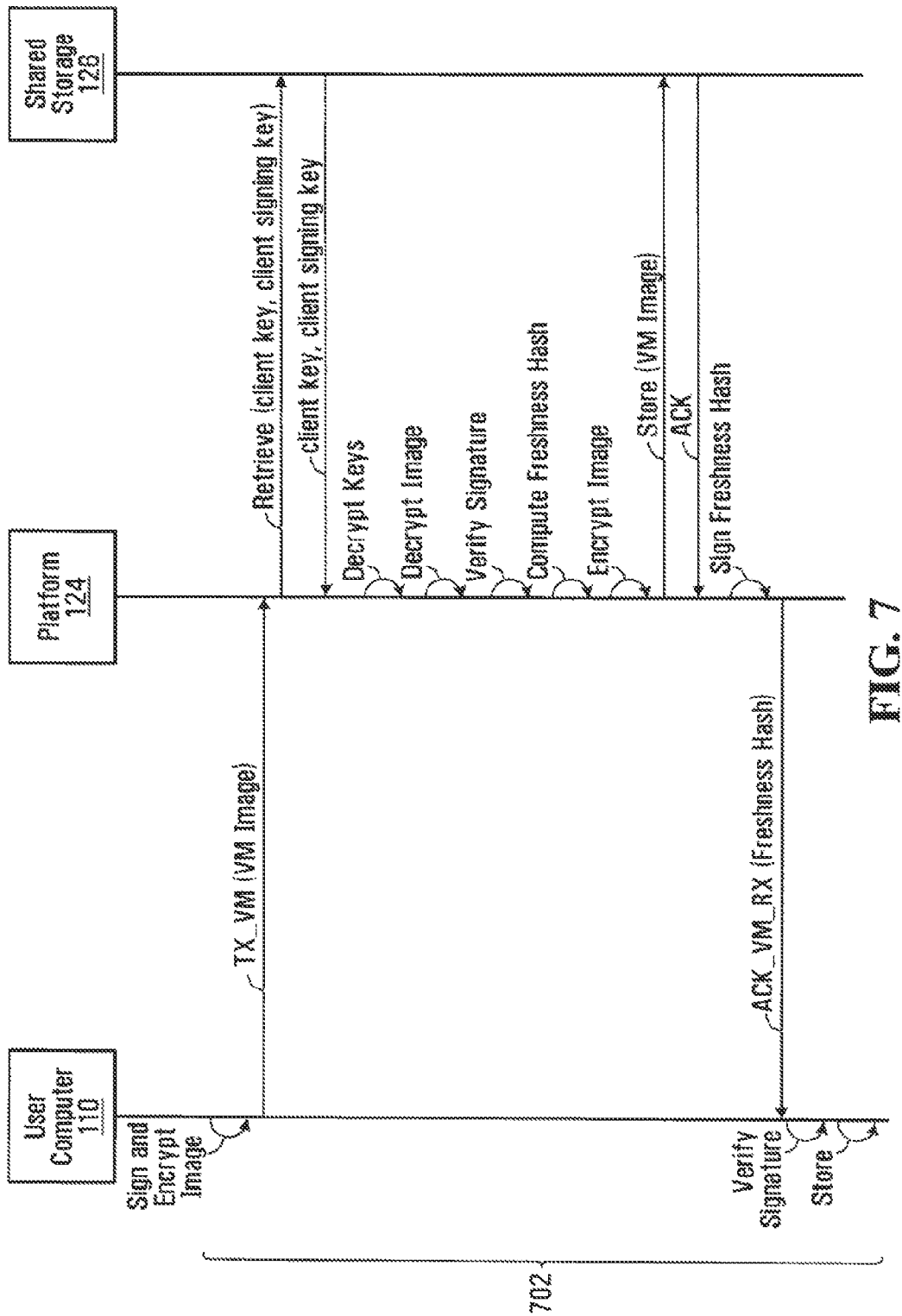
FIG. 7 is a sequence diagram for registration of a virtual machine on a trusted platform, according to an embodiment.

FIG. 7 illustrates a sequence diagram for registration of a VM 210 on a platform 124 by a registered user computer 110, according to an embodiment of the disclosure.

At steps 702, a registered user computer 110 transmits to TCC 120 an image of a VM 210 which it wishes TCC 120 to provision and execute in the future. Before transmitting the VM image, VMVC 307 running on user computer 110 signs and encrypts the VM image using client signing key 312 and client key 310. VMVC 307 then transmits the signed and encrypted VM image inside a message TX_VM. In response to the TX_VM message, VMVS 207 running on platform 124 retrieves from CKDB 504 encrypted copies of keys 310, 312 associated with the particular user computer 110, obtains TCK 408 from HSM 204, decrypts the encrypted copies of keys 310, 312 using TCK 408, and uses the decrypted copies of keys 310, 312 to decrypt the received VM image and verify its signature. Once the signature on the VM image is verified, VMVS 207 computes a freshness hash of the VM image using the capabilities of HSM 204 in known manners. For example, this could be accomplished by computing a cryptographic hash, such as SHA-1, over the VM image. VMVS 207 then re-encrypts the VM image using client key 310, and stores the signed-and-encrypted VM image in VMIDB 502. VMVS 207 then signs the freshness hash using client signing key 312, and transmits an acknowledgement message (ACK_VM_RX) containing the signed freshness hash to user computer 110 acknowledging that TX_VM has been successfully processed. Upon receiving the ACK_VM_RX message, VMVC 307 verifies the signature on the received freshness hash, and stores the freshness hash for later use as described below.

Figure 8:
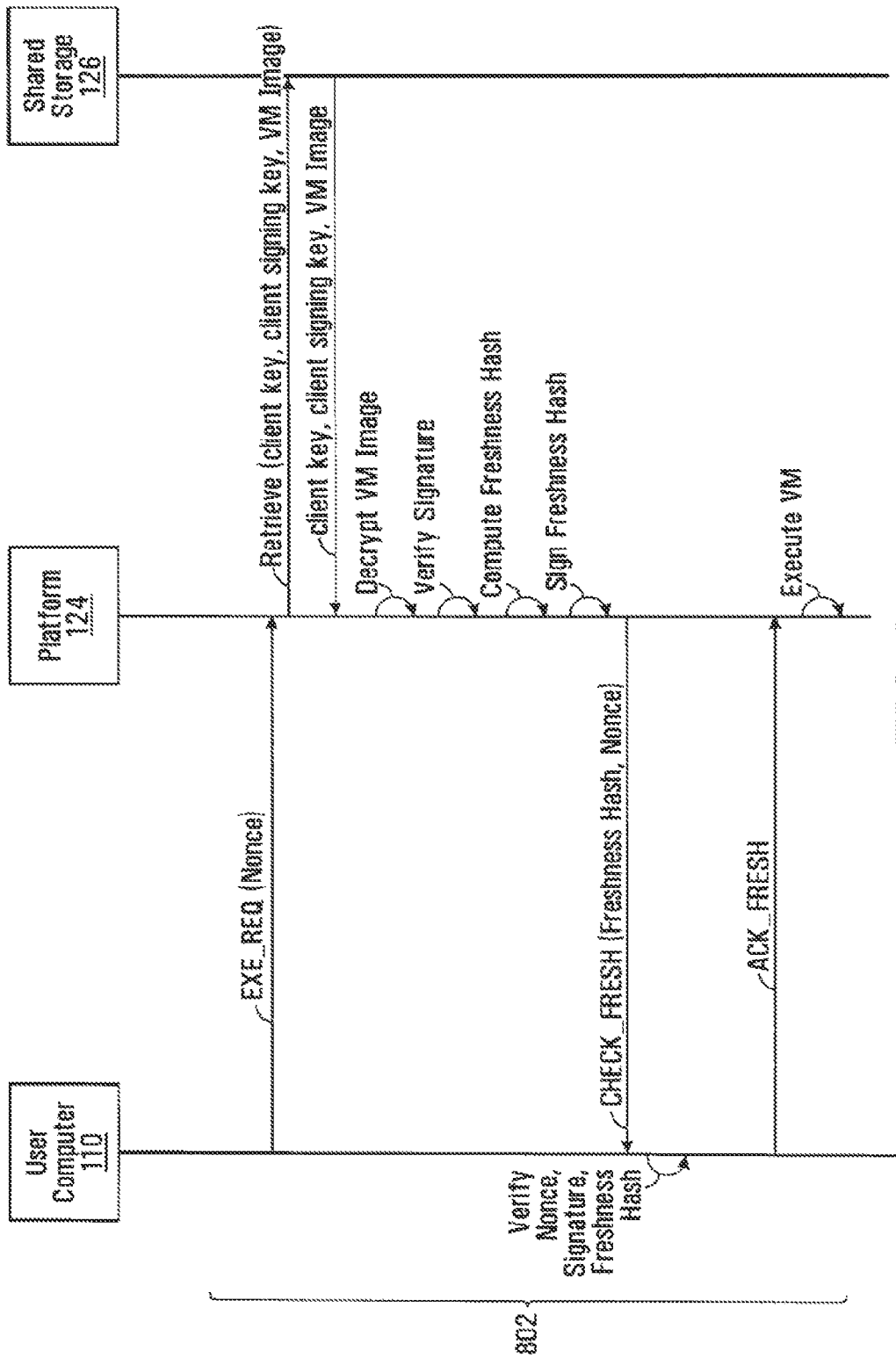
FIG. 8 is a sequence diagram for provisioning a registered virtual machine for execution on a trusted platform, according to an embodiment.

FIG. 8 illustrates a sequence diagram for provisioning a registered VM 210 for execution on a platform 124, according to an embodiment of the disclosure.

At steps 802, a registered user computer 110 indicates to platform 124 that it wishes platform 124 to execute a registered VM 210 by transmitting an execution request (EXE_REQ) message containing a nonce to platform 124. As is appreciated, a nonce is a unique cryptographic token that is only used once and is typically added to messages in order to prevent replay attacks. In response to the EXE_REQ message, VMVS 207 running on platform 124 retrieves from CKDB 504 encrypted copies of keys 310, 312 associated with the particular user computer 110, and also retrieves from VMIDB 502 the signed-and-encrypted VM image of VM 210. VMVS 207 then obtains TCK 408 from HSM 204, decrypts the encrypted copies of keys 310, 312 using TCK 408, and uses the decrypted copies of keys 310, 312 to decrypt the retrieved VM image and verify its signature. Once the signature on the VM image is verified, VMVS 207 computes a freshness hash for the VM image, signs the freshness hash using client signing key 312, and transmits a check freshness hash (CHECK_FRESH) message containing the signed freshness hash and the received nonce to user computer 110.

In response to the CHECK_FRESH message, VMVC 307 running on registered computer 110 verifies the nonce, verifies the signature on the freshness hash using client signing key 312, and verifies the received freshness hash against the last received freshness hash for VM 210 to ensure it was not tampered with in the interim. Once the nonce, signature, and freshness hash are verified, VMVC 307 transmits an ACK_FRESH message to platform 124 indicating that verification was successful. In response to the ACK_FRESH message, platform 124 begins executing VM 210.

Figure 9:
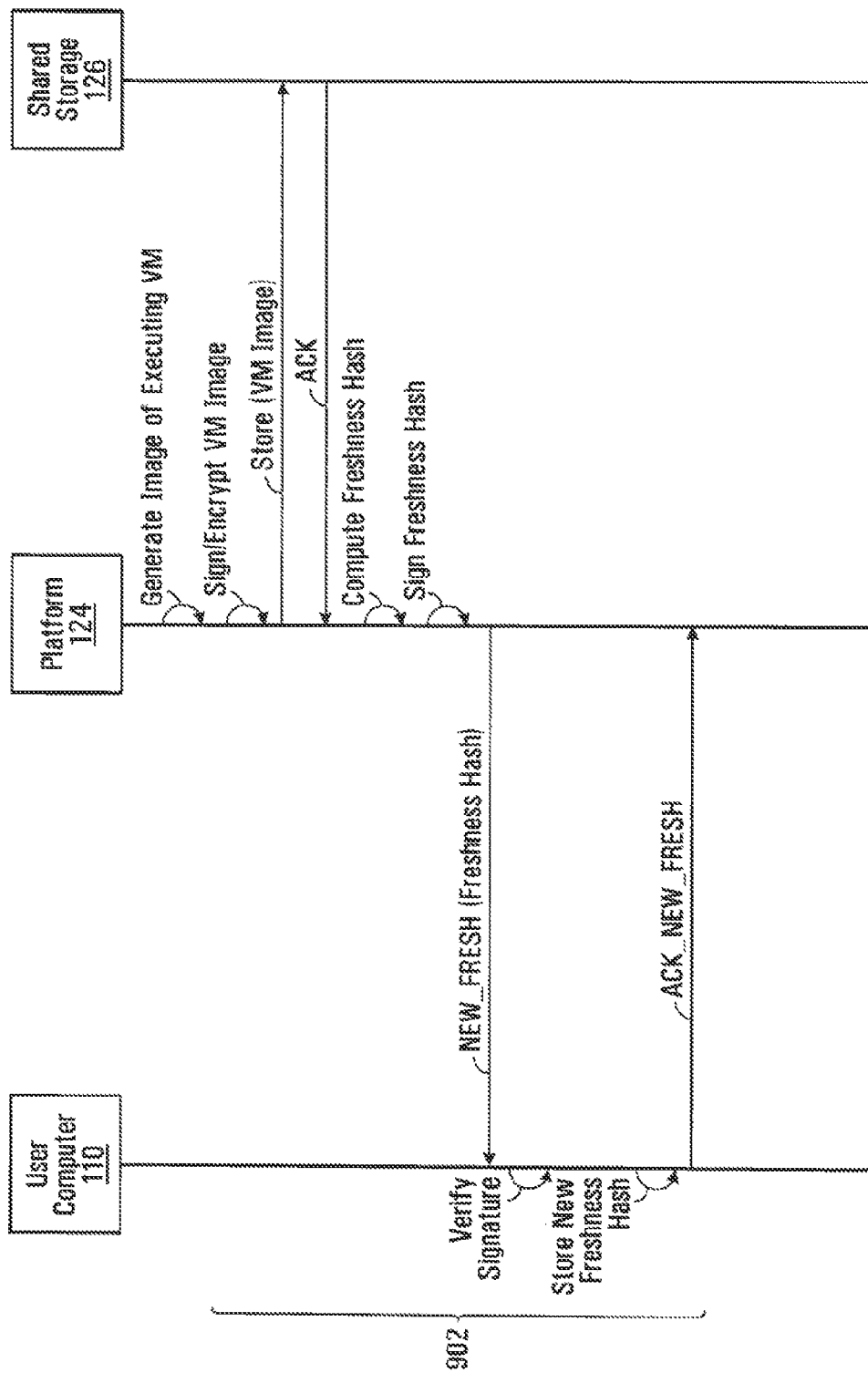
FIG. 9 is a sequence diagram for verifying the freshness of a virtual machine executing on a trusted platform, according to an embodiment.

While executing a VM 210, platform 124 may periodically capture a snapshot image of the execution state of the VM 210 and encrypt and store the snapshot image in shared storage 126 so that, in the event of a failure of the platform 124, another suitable platform may resume execution from the snapshot. Advantageously, when such a snapshot occurs, the platform 124 provides the client with an updated freshness hash of the running VM so that, should a failure occur, the client can verify the integrity of the snapshot before execution resumes from the stored snapshot. FIG. 9 illustrates a sequence diagram for updating the client with a freshness hash of a provisioned and running VM 210 executing on a platform 124, according to an embodiment of the disclosure.

At steps 902, VMVC 307 running on user computer 110 associated with a VM 210 executing on a platform 124 is updated with a freshness hash of VM 210. VMVS 207 running in platform 124 generates a snapshot image of the executing VM 210. Platform 124 then signs and encrypts the VM image using client signing key 312 and client key 310 (which may have been retrieved from CKDB 504 and decrypted using TCK 408), and stores the signed-and-encrypted VM image in VMIDB 502. After this is complete, platform 124 computes a freshness hash for the VM image, signs the freshness hash using client signing key 312 (which may have been retrieved from CKDB 504 and decrypted using TCK 408), and transmits a new freshness hash (NEW_FRESH) message containing the signed freshness hash to user computer 110.

In response to the NEW_FRESH message, VMVC 307 running on registered computer 110 verifies the signature on the freshness hash using client signing key 312. VMVC 307 then stores the newly received freshness hash for future use, and transmits an ACK_NEW_FRESH message to platform 124. If platform 124 does not receive an ACK_NEW_FRESH from the client after an appropriate period of time (i.e. a timeout), it may continue to retransmit the NEW_FRESH message with the freshness hash until it receives an ACK_NEW_FRESH from the client.

Figure 10:
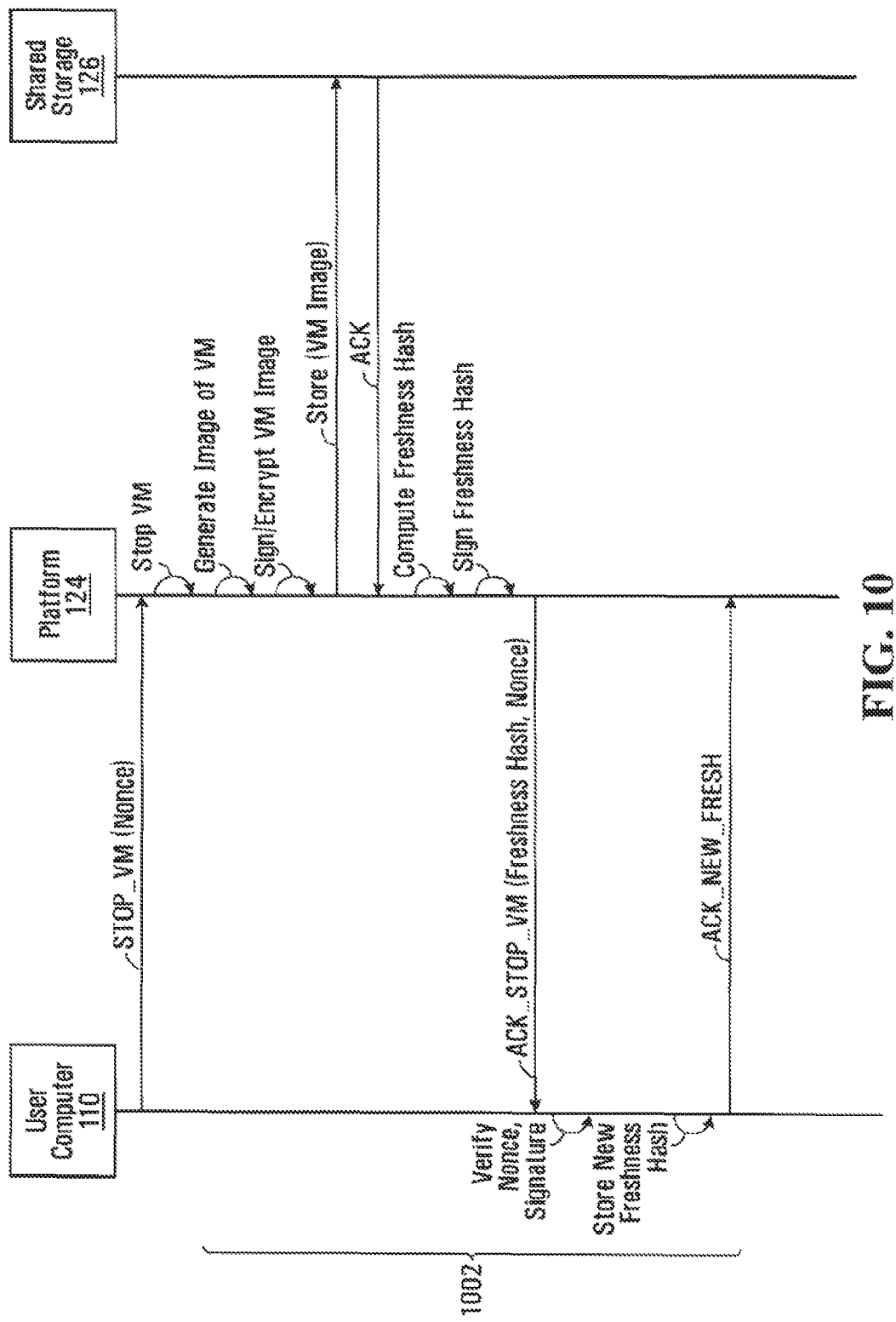
FIG. 10 is a sequence diagram for stoping execution of a virtual machine executing on a trusted platform, according to an embodiment.

FIG. 10 illustrates a sequence diagram for ceasing execution of a VM 210 executing on a platform 124, according to an embodiment of the disclosure.

At steps 1002, VMVC 307 running on a user computer 110 associated with a VM 210 executing on platform 124 causes execution of VM 210 to cease. VMVC 307 initiates the process by transmitting a stop VM (STOP_VM) message containing a nonce to platform 124. In response to the STOP_VM message, VMVS 207 running in platform 124 ceases execution of VM 210, generates an image of VM 210, signs and encrypts the VM image using client signing key 312 and client key 310 (which may have been retrieved from CKDB 504 and decrypted using TCK 408), and stores the signed-and-encrypted VM image in VMIDB 502. Platform 124 then computes a freshness hash for the VM image, signs the freshness hash using client signing key 312 (which may have been retrieved from CKDB 504 and decrypted using TCK 408), and transmits an ACK_STOP_VM message containing the signed freshness hash and the received nonce to user computer 110.

In response to the ACK_STOP_VM message, VMVC 307 running on registered computer 110 verifies the nonce, verifies the signature on the freshness hash using client signing key 312. Once the nonce and signature are verified, VMVC 307 stores the newly received freshness hash for future use, and transmits an ACK_NEW_FRESH message to platform 124 indicating that it received the new freshness hash successfully. In response to the ACK_NEW_FRESH message. If platform 124 does not receive an ACK_NEW_FRESH from the client after an appropriate period of time (i.e. a timeout), it may continue to retransmit the ACK_STOP_VM message with the freshness hash until it receives a ACK_NEW_FRESH from the client.

In the scenarios described above with reference to FIGS. 6-10, if any of the verification steps fail—e.g. a nonce does not match the expected nonce, a signature does not match the expected signature, or a freshness hash does not match the expected freshness hash—a warning may be generated at the associated user computer 110 via VMVC 307.

It should be noted that, though not shown, commands originating from user computer 110 in the scenarios illustrated in FIGS. 6-10 may be authenticated to ensure they are coming from a valid source. For example, before accepting any commands from user computer 110, platform 124 may require user computer 110 to authenticate itself using a standard username and password, or present proof, in the form of an authentication cookie, that it has already authenticated with a separate, trusted authentication server (not shown).

Referring to FIG. 1, TCC 120 may be capable of performing load balancing amongst platforms 124a-124c. In some embodiments, the load balancing functionality of TCC 120 may be carried out in accordance with a load balancing algorithm residing on an administration platform (AP) 122.

Any conventional load balancing algorithm may be used to distribute execution load efficiently amongst platforms 124a-124c. In some instances, the load balancing algorithm may trigger migration of an executing VM from, for example, a first platform 124a to a second platform 124b. Upon receiving a migration request, platform 124a generates a snapshot image of the execution state of the VM in accordance with the steps shown in FIG. 9 and described above. Platform 124b subsequently resumes execution of the VM from the stored snapshot in accordance with the steps shown in FIG. 8 and described above. Advantageously, platforms 124a and 124b do not need to verify each other's trustworthiness (for example, via conventional remote attestation processes).

Figure 11:
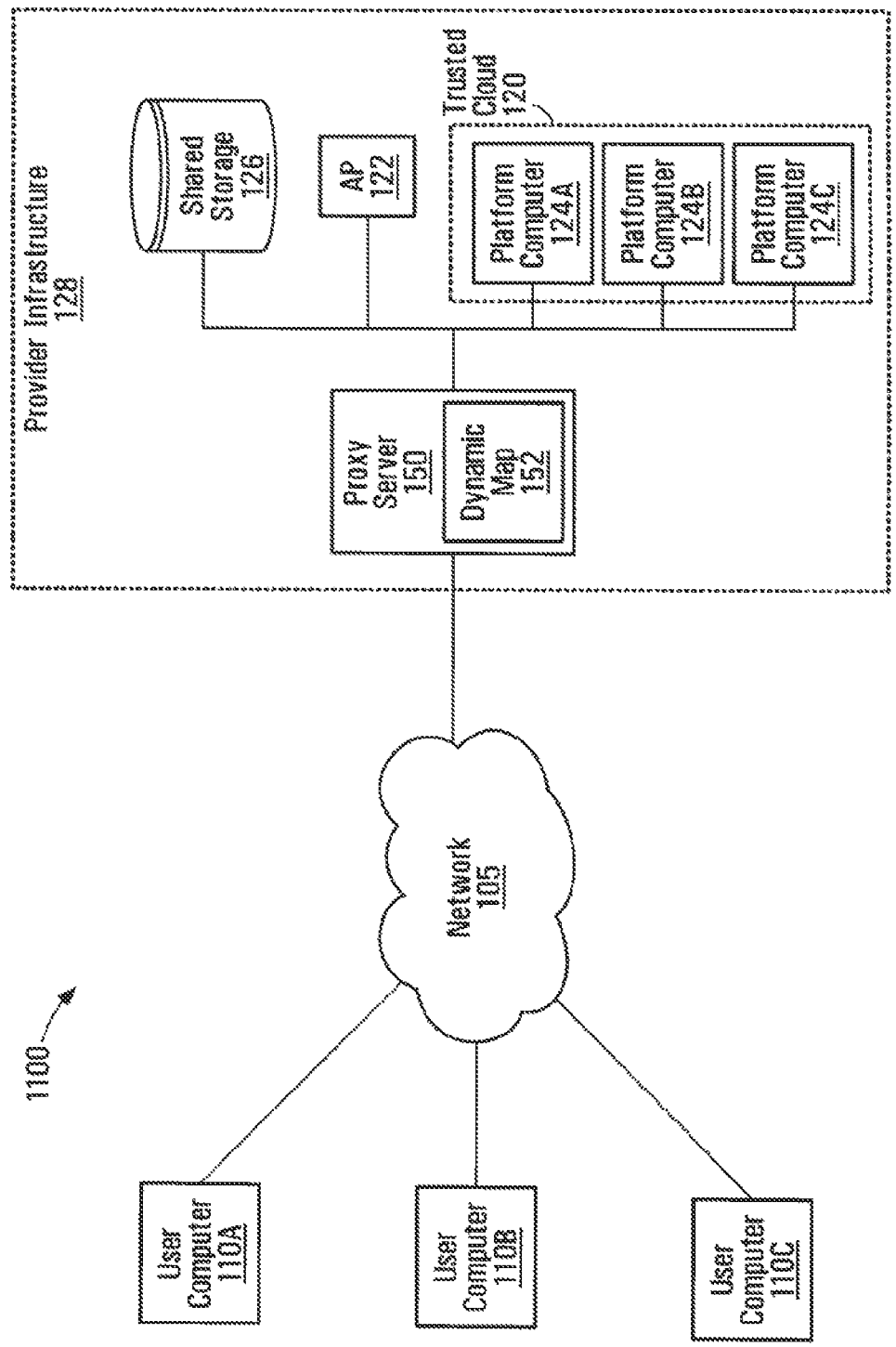
FIG. 11 is a schematic diagram of a system for providing secure cloud computing according to a further embodiment.

Referring to FIG. 11, a proxy server 150 may be interposed between user computers 110a-110c and TCC 120. As shown, proxy server 150 includes a dynamic map 152 holding current associations between user computers 110a-110c and platforms 124a-124c that enables proxy 150 to route messages between each user computer 110a-110c and a corresponding platform 124a-124c. Upon receiving a communication, such as a packet from the VMVC 307 of a user computer 110, proxy server 150 is configured to determine the source address of the received packet, perform a look-up against dynamic map 152 to determine an associated destination address, such as that of a platform 124, and route the packet to the destination address. As will be appreciated, dynamic map 152 is updated when new associations between user computers 110a-110c and platforms 124a-124c are created, or when existing associations are modified (e.g. through migration) or terminated.

Other modifications will be apparent to those skilled in the art and, therefore, the invention is defined in the claims.

What is claimed is:

1. A method of secure cloud computing performed using at least one computer within a trusted computing cloud, comprising:
    obtaining a record of execution state information of a virtual machine (VM) associated with a client, wherein the record of the execution state information comprises a snapshot image of the execution state of the VM;
    retrieving an encrypted client key and encrypted client signing key from a shared storage associated with the trusted computing cloud;
    decrypting the encrypted client key and the encrypted client signing key utilizing a trusted cloud key retrieved from a hardware security module of said at least one computer;
    encrypting the record utilizing the client key;
    arranging storage of the encrypted record in the shared storage at a first point in time;
    determining a first freshness hash of the record;
    signing the first freshness hash utilizing the client signing key;
    sending the signed first freshness hash of the record to the client;
    decrypting the encrypted record retrieved from the shared storage utilizing the client key responsive to receiving a request from the client to execute the VM in the trusted computing cloud at a second point in time after the first point in time;
    determining a second freshness hash of the decrypted record retrieved from the shared storage;
    signing the second freshness hash utilizing the client signing key;
    sending the signed second freshness hash of the record to the client; and
    executing the VM on the trusted computing cloud responsive to the client verifying integrity of the execution state information of the VM contained in the record, the verification being based on a comparison of the second freshness hash with the first freshness hash.

2. The method of claim 1 further comprising:
    ceasing execution of the VM at a third point in time after the second point in time;
    generating a new record of execution state information of the VM at the third point in time;
    encrypting the new record utilizing the client key;
    arranging storage of the new record in the shared storage;
    determining a new freshness hash of the new record;
    signing the new freshness hash utilizing the client signing key;
    sending the new freshness hash to the client; and
    receiving an indication from the client verifying the integrity of the new freshness hash.

3. The method of claim 1 wherein the shared storage comprises a database.

4. The method of claim 3 wherein the database is outside the trusted computing cloud.

5. The method of claim 1 wherein the client key and the client signing key are symmetric keys.

6. The method of claim 1 wherein the hardware security module comprises a trusted platform module.

7. The method of claim 1 wherein obtaining the record of the execution state of the VM is responsive to a communication from the client to cease execution of the VM.

8. The method of claim 1 wherein obtaining the record of the execution state of the VM is responsive to a migration request from a load balancing algorithm.

9. The method of claim 1 further comprising:
    at a server:
        receiving a communication;
        determining the communication is from the client;
        determining the VM associated with the client is executing on said at least one computer within the trusted computing cloud; and
        routing the communication to said at least one computer.

10. The method of claim 9 wherein:
    the communication comprises a packet;
    the determining the communication is from the client comprises determining a source address of the packet; and
    the determining the VM associated with the client is executing on said at least one computer within the trusted computing cloud comprises performing a look-up against a map to determine an association between the source address and said at least one computer.

11. The method of claim 1 wherein the record is configured for utilization, upon failure of the VM, in resuming execution of the VM from the record.

12. The method of claim 1 further comprising, at a fourth point in time after the third point in time and prior to ceasing execution of the VM, updating the first freshness hash by:
    determining an updated record of the current state information for the VM executing on the trusted computing cloud;
    encrypting the updated record using the client key;
    arranging storage of the updated record in the shared storage;
    computing an updated freshness hash for the updated record;
    signing the updated freshness hash using the client signing key; and transmitting a verify freshness message containing the signed updated freshness hash to the client; and receiving from the client a new freshness hash acknowledgement message responsive to the client verifying the signature of the updated freshness hash utilizing the client signing key.

13. A computer program product comprising a non-transitory computer-readable storage medium storing computer executable instructions that, when executed by at least one computer within a trusted computing cloud cause said at least one computer to:

obtain a record of execution state information of a virtual machine (VM) associated with a client, wherein the record of the execution state information comprises a snapshot image of the execution state of the VM;

retrieve an encrypted client key and encrypted client signing key from a shared storage associated with the trusted computing cloud;

decrypt the encrypted client key and the encrypted client signing key utilizing a trusted cloud key retrieved from a hardware security module of said at least one computer;

encrypt the record utilizing the client key;

arrange storage of the encrypted record in the shared storage at a first point in time;

determine a first freshness hash of the record;

sign the first freshness hash utilizing the client signing key;

send the signed first freshness hash of the record to the client;

decrypt the encrypted record retrieved from the shared storage at a second point in time after the first point in time utilizing the client key responsive to receiving a request from the client to execute the VM in the trusted computing cloud;

determine a second freshness hash of the decrypted record retrieved from the shared storage;

sign the second freshness hash utilizing the client signing key;

send the signed second freshness hash of the record to the client; and execute the VM on the trusted computing cloud responsive to the client verifying integrity of the execution state information of the VM contained in the record, the verification being based on a comparison of the second freshness hash with the first freshness hash.

14. The computer program product of claim 13 wherein the computer executable instructions when executed by said at least one computer further cause said at least one computer to:

cease execution of the VM at a third point in time after the second point in time;

generate a new record of execution state information of the VM at the third point in time;

encrypt the new record utilizing the client key;

arrange storage of the new record in the shared storage;

determine a new freshness hash of the new record;

sign the new freshness hash utilizing the client signing key;

send the new freshness hash to the client; and receive an indication from the client verifying the integrity of the new freshness hash.

15. The computer program product of claim 13 wherein the record is configured for utilization, upon failure of the VM, in resuming execution of the VM from the record.

16. The computer program product of claim 13 wherein the shared storage comprises a database outside the trusted computing cloud.

17. The computer program product of claim 13 wherein the client key and the client signing key are symmetric keys.

18. The computer program product of claim 13 wherein the hardware security module comprises a trusted platform module.

19. The computer program product of claim 13 wherein obtaining the record of the execution state of the VM is responsive to a communication from the client to cease execution of the VM.

20. The computer program product of claim 13 wherein obtaining the record of the execution state of the VM is responsive to a migration request from a load balancing algorithm.

21. A trusted computing cloud comprising:

at least one computer configured to:

obtain a record of execution state information of a virtual machine (VM) associated with a client, wherein the record of the execution state information comprises a snapshot image of the execution state of the VM;

retrieve an encrypted client key and encrypted client signing key from a shared storage associated with the trusted computing cloud;

decrypt the encrypted client key and the encrypted client signing key utilizing a trusted cloud key retrieved from a hardware security module of said at least one computer;

encrypt the record utilizing the client key;

arrange storage of the encrypted record in the shared storage at a first point in time;

determine a first freshness hash of the record;

sign the first freshness hash utilizing the client signing key;

send the signed first freshness hash of the record to the client;

decrypt the encrypted record retrieved from the shared storage at a second point in time after the first point in time utilizing the client key responsive to receiving a request from the client to execute the VM in the trusted computing cloud;

determine a second freshness hash of the decrypted record retrieved from the shared storage;

sign the second freshness hash utilizing the client signing key;

send the signed second freshness hash of the record to the client; and execute the VM on the trusted computing cloud responsive to the client verifying integrity of the execution state information of the VM contained in the record, the verification being based on a comparison of the second freshness hash with the first freshness hash.

22. The trusted computing cloud of claim 21 wherein:

said at least one computer comprises a first computer and at least a second computer different from the first computer;

the first computer is configured to arrange the storage of the encrypted record in the shared storage at the first point in time; and the second computer is configured to execute the VM on the trusted computing cloud responsive to the client verifying integrity of the execution state information of the VM contained in the record.

23. The trusted computing cloud of claim 21 wherein said at least one computer is further configured to:

cease execution of the VM at a third point in time after the second point in time;

generate a new record of execution state information of the VM at the third point in time;

encrypt the new record utilizing the client key;

arrange storage of the new record in the shared storage;

determine a new freshness hash of the new record;

sign the new freshness hash utilizing the client signing key;

send the new freshness hash to the client; and receive an indication from the client verifying the integrity of the new freshness hash.

24. The trusted computing cloud of claim 21 wherein said at least one computer is further configured, at a fourth point in time after the third point in time and prior to ceasing execution of the VM, to update the first freshness hash by:

determining an updated record of the current state information for the VM executing on the trusted computing cloud;

encrypting the updated record using the client key;

arranging storage of the updated record in the shared storage;

computing an updated freshness hash for the updated record;

signing the updated freshness hash using the client signing key; and transmitting a verify freshness message containing the signed updated freshness hash to the client; and receiving from the client a new freshness hash acknowledgement message responsive to the client verifying the signature of the updated freshness hash utilizing the client signing key.

25. The trusted computing cloud of claim 21 wherein the shared storage comprises a database outside the trusted computing cloud.

26. The trusted computing cloud of claim 21 wherein the client key and the client signing key are symmetric keys.

27. The trusted computing cloud of claim 21 wherein the hardware security module comprises a trusted platform module.

28. The trusted computing cloud of claim 21 wherein obtaining the record of the execution state of the VM is responsive to a communication from the client to cease execution of the VM.

29. The trusted computing cloud of claim 21 wherein obtaining the record of the execution state of the VM is responsive to a migration request from a load balancing algorithm.

30. The trusted computing cloud of claim 21 wherein the record is configured for utilization, upon failure of the VM, in resuming execution of the VM from the record.

* * * * *